United States Patent [19]

Thibeault

[11] Patent Number: 5,179,868
[45] Date of Patent: Jan. 19, 1993

[54] DRIVE TRAIN ENABLE-DISABLE VEHICLE USE DEVICE

[76] Inventor: Roland Thibeault, 5923 West Maplewood Dr., Littleton, Colo. 80123

[21] Appl. No.: 844,785

[22] Filed: Mar. 2, 1992

[51] Int. Cl.⁵ ............................................. F16H 57/10
[52] U.S. Cl. ..................... 74/411.5; 74/335; 70/248
[58] Field of Search .............. 74/335, 846, 878, 411.5; 70/247, 248; 180/287

[56] References Cited

U.S. PATENT DOCUMENTS

| | | | |
|---|---|---|---|
| 1,662,099 | 3/1928 | Anderson | 70/251 |
| 2,890,581 | 6/1959 | Lewis | 70/248 |
| 2,974,752 | 3/1961 | Howard | 188/69 |
| 3,610,004 | 10/1971 | Neese | 70/248 |
| 3,718,202 | 2/1973 | Brock | 180/114 |
| 3,788,422 | 1/1974 | Bowler | 180/114 |
| 3,939,940 | 2/1976 | Sasabe et al. | 180/82 C |
| 3,947,693 | 3/1976 | Eskenas | 307/10 AT |
| 3,977,488 | 8/1976 | Kameyama | 180/82 |
| 4,158,874 | 6/1979 | Ellsberg | 361/172 |
| 4,177,657 | 12/1979 | Aydin | 70/228 |
| 4,232,758 | 11/1980 | Crosas | 180/287 |
| 4,457,187 | 7/1984 | Tsuboi | 74/411.5 |
| 4,576,261 | 3/1986 | Barr | 74/411.5 X |
| 4,615,355 | 10/1986 | Garcia et al. | 137/383 |
| 4,690,240 | 9/1987 | Russo | 180/287 |
| 4,719,999 | 1/1988 | Ohkubo | 74/411.5 X |
| 4,884,654 | 12/1989 | Durigon et al. | 180/287 |
| 4,932,494 | 6/1990 | Chandler | 180/287 |
| 4,947,968 | 8/1990 | Slavin et al. | 192/4 A |
| 4,976,171 | 12/1990 | Sharp et al. | 74/878 |
| 5,045,837 | 9/1991 | Gosker | 180/287 X |

FOREIGN PATENT DOCUMENTS 2572037 4/1986 France.

OTHER PUBLICATIONS

Motor Book Parts and Time Guide—1981 Edition Professional Service Trade Edition—pp. 793, 799.
Modern Automotive Mechanics by James E. Duffy 1990 pp. 663–722.
Chilton's Guide To Automatic Transmission Repair 1988 pp. 3-3 to 3-74, 4-193 to 4-232, 4-256, 6-124.

*Primary Examiner*—Leslie A. Braun
*Assistant Examiner*—Ryan W. Massey
*Attorney, Agent, or Firm*—Norvell E. Von Behren

[57] ABSTRACT

An improved motor vehicle transmission locking device for use with automatic transmissions and manual transmissions. The improved locking device utilizes a solenoid which is used to lock into a notch formed on an existing transmission parking shaft to lock the transmission in the parked position. The solenoid is mounted inside of the transmission case and may be activated by an encoder/decoder circuit and may also be activated by a simple switch or lock switch hidden out of sight on the motor vehicle.

A modified form of the invention replaces the existing transmission parking shaft with a split shaft and positions the solenoid between the two pieces of the split shaft. This modification then accomplishes the enabling and disabling of the transmission when activated by either the encoder/decoder circuit or by other switching circuits positioned on, and hidden from a thief that may try to steal the motor vehicle.

6 Claims, 4 Drawing Sheets

DRIVE TRAIN ENABLE-DISABLE VEHICLE USE DEVICE

CROSS REFERENCES TO RELATED APPLICATIONS

U.S. patent application Ser. No. 07/693,371, filed Apr. 30, 1991 by Roland Thibeault and entitled "Drive Train Enable-Disable Vehicle Use Device"—Group Art Unit 352.

U.S. patent application Ser. No.; 07/674,454, filed Mar. 25, 1991 by Roland Thibeault and entitled "Restricted Vehicle Transmission Use Device"—Group Art Unit 316.

FIELD OF THE INVENTION

This invention relates generally to a motor vehicle immobilizing device and specifically relates to a transmission locking device operated by a solenoid located within the transmission to lock or unlock a shaft or part of the transmission such as the parking shaft of the transmission.

BACKGROUND OF THE INVENTION

A variety of systems have been developed to reduce the ease with which automobiles are stolen and thus the incidence of automobile theft. Some of the systems involve locking the vehicle transmission in some manner. The problems inherent in these systems are the ease of bypassing the system when the locking device is located on the outside of the transmission or the difficulty of installation when the locking device is located on the inside of the transmission.

From prior searches by the applicant as well as by the Patent Examiners in the above mentioned cases, the following patents represent various known systems designed in the past:

French Patent #2,572,037, issued on Oct. 22, 1984, to Barbarot teaches an encoder linked to an electromagnetic device which engages a multiple rocker arm mechanism that locks the clutch cable thereby preventing movement of the clutch lever.

U.S. Pat. No. 1,662,099, issued on Mar. 13, 1928, to O. A. Anderson teaches a mechanical locking device for motor vehicles that operates in conjunction with the ignition switch to lock the transmission. The patent shows the ignition switch mounted in the transmission shifting lever where insertion and rotation of the key causes a plunger in the shifting lever to engage the transmission shifting ball allowing the user to then shift gears.

When the key is then rotated in the opposite direction, thereby turning off the engine, the plunger is released from the ball and the shifting lever will no longer operate to shift the gears in the transmission. The Applicant's device eliminates the need for a key ignition type locking and eliminates the need for steering locks while also providing accidental damage to the transmission in a modified form of the invention.

U.S. Pat. No. 4,615,355, issued on Oct. 7, 1986, to Garcia et al. teaches an automobile anti-theft device which mechanically locks the automatic transmission of an automobile utilizing a bolt which blocks the shifting lever, detent lever or manual valve. The bolt is held in proper position by a series of metal plates fixedly attached to a base which is then attached to the lever to be locked.

The bolt is held in the locked position by a spring which the bolt runs through. The bolt is moved into the unlocked position by means of a steel cable, electromagnetic device or vacuum. The means used to unlock the bolt (steel cable, electromagnetic or vacuum) is not described except to indicated that they are available methods to move the bolt out of the locking position. However, an armored line employed to prevent tampering of the locking means is described.

U.S. Pat. No. 4,976,171, issued on Dec. 11, 1990, to Sharp et al. teaches a transmission shifter to operate controlled mechanism interlock utilizing a cable assembly attached to a toothed rack and a pawl operated by a solenoid that engages the teeth of the rack. The locking device is activated when the transmission selector lever is placed in the park position.

It is deactivated when the operator of the vehicle places his/her foot on the service brake thus allowing the selector lever to be moved from a non-drive position to a drive position. This device does not provide any security for the vehicle which one of the intents of the Applicant's invention. This device also requires a steering column lock which is a common theft deterrent method. The Applicant's device provides vehicle security and also eliminates the need for steering column locking.

U.S. Pat. No. 4,947,968, issued on Aug. 14, 1990, to Slavin et al. teaches a transmission mounted solenoid interlock device which is mounted on the transmission and when energized or de-energized will engage a notch located on the shift actuating lever.

U.S. Pat. No. 3,610,004, issued on Oct. 5, 1971, to Neese teaches a parking lock for transmissions that employs a locking wheel fixed to a transmission output shaft that is engaged by a spring activated piston and rod device. The rod is disengaged from the locking wheel by hydraulic pressure acting on the piston to overcome the force of the spring.

A blocker pin is also moved into a position which prevents the piston from moving out of the unlock position. The hydraulic pressure is produced by the transmission when the engine is started. When the engine is shut off, the hydraulic pressure on the blocker bin and piston are released and the pressure of the spring forces the rod into the locking wheel.

U.S. Pat. No. 4,884,654, issued on Dec. 5, 1989, to Durigon teaches a transmission control locking device that disables the drive train utilizing a spring loaded solenoid that locks the clutch actuation lever when the transmission gear selector is placed in a predetermined position and the solenoid is de-energized. The solenoid is energized by a remotely controlled electronic circuit (not described) thereby releasing the clutch actuation lever.

U.S. Pat. No. 4,177,657, issued on Dec. 11, 1979, to Aydin teaches an electronic lock system utilizing an encoded key and decoder which activate an electric clutch operated bolt mechanism or will change the code which activates the electric clutch. The decoder can be an opto-electronic, magnetic other electrical device capable of decoded the encode key.

The clutch is not activated until the key is removed from the lock thereby preventing the user from leaving the key in the lock. The system allows for operation by battery power since only the clutch need be activated and not the bolt mechanism itself. The system provides for multi-access levels (e.g. master keys, floor keys, backup keys, etc.). A timer is incorporated which switches power only to the circuits needed for operation at the time of use.

The system may also be interfaced with other security devices such as an electronic alarm. The code on the key may be self canceling for one time use or may be controlled by a manual switch which restricts the number of uses. This device will not work positioned inside of a transmission case as the Applicant's device functions.

U.S. Pat. No. 3,718,202 issued on Feb. 27, 1973, to Brock teaches vehicle anti-theft system utilizing an encoder panel which accepts a code sequence, a decoder and lock mechanism. The lock mechanism is comprised of a solenoid, shaft, extending member and locking gear. The locking gear is wedged between transmission gears to prevent movement of the drive train.

A predetermined four digit code is entered into a control panel thereby operating the lock mechanism. The encoder-decoder combination may also be used to prevent ignition of the engine as well as preventing movement of the drive train. This device requires major design changes to the transmission to incorporate it into a transmission or to add it to an existing transmission.

This would not be a practical solution to the problem solved by the Applicant's invention. The device also does not prevent damage to the transmission or the device itself by accidental shifting of the vehicle operating lever as is accomplished in a modified form of the Applicant's invention.

U.S. Pat. No. 2,974,752, issued on Mar. 14, 1961, to H. L. Howard teaches an older parking brake mechanism that is power operated and uses electrically operated solenoids with an actuator to prevent rotation of a toothed locking member. The actuator includes rollers carried along a guide surface to accomplish the movement of the locking in the device. The complex solenoid mechanism used in this device makes this brake mechanism more expensive and the Applicant's device accomplishes the security of this device in a much simpler manner which eliminates the need for steering column ignition locks and other complicated mechanical combinations.

U.S. Pat. No. 2,890,581, issued on Jun. 16, 1959, to D. T. Lewis teaches a device to lock the operator shift lever from moving until a positive act such as closing of the ignition switch or a manually operated device connected directly to the car lock is accomplished. This device is not protected from external tampering by a thief and does not protect the shift lever from external movement when the vehicle is locked, as is accomplished in the modified form of the Applicant's invention.

U.S. Pat. No. 3,939,940, issued on Feb. 24, 1976, to Y. Sasabe et al teaches a device to lock the gear shift mechanism of a manually operated power transmission system and utilizes a solenoid in combination with a first and second movable member to accomplish the locking. The solenoid is actuated by connecting the seat belt in the cab of the motor vehicle.

U.S. Pat. No. 3,977,488, issued on Aug. 31, 1976, to T. Kameyama teaches a shift locking device for a manual transmission which prevents the manual transmission shifting rod from shifting into a gear unless a predetermined safety measure such as wearing a safety belt has been taken by the driver. This device has no security protection from outside deactivation by a thief and also requires the normal steering column lock used in automotive vehicles. The device also does not prevent accidental damage to the manual transmission or the device itself should the thief try to force the shift lever to a desired position.

U.S. Pat. No. 4,232,758, issued Nov. 11, 1980, to P. B. Crosas teaches an electro-mechanical anti-theft system where electrovalves are opened in the automobile piping of the brake line, clutch line and fuel line with the obstruction of the fluid piping being designed to be used as an anti-theft system of the motor vehicle. The system is designed to produce obstructions in the various pipes corresponding to the brake liquid, the clutch and the gasoline feed so that when the vehicle is at rest the fuel feed is interrupted, the wheels are braked and the clutch is released.

U.S. Pat. No. 3,947,693, issued Mar. 30, 1976, to J. L. Eskenas teaches an electrical pushbutton ignition combination lock which is wired into the electrical circuit of the motor of an automobile or power boat. By pushing the proper combination of buttons, a relay is energized to complete the ignition circuit with the pressing of other buttons serving to ground the circuit and disable the device.

U.S. Pat. No. 4,158,874, issued Jun. 19, 1978, to T. R. Ellsberg teaches a safety interlock system for automotive vehicles with the system comprising a plurality of latches formed in integrated circuits which can only be opened in a predetermined sequence with a predetermined code of indicia.

U.S. Pat. No. 3,788,422, issued Jun. 29, 1974, to L. L. Bowler teaches a push button transmission selector mechanism and electronic lock and control logic for preventing unauthorized use of a motor vehicle. The ignition circuit and selector mechanism of the motor vehicle is locked until a code number is entered by the operator.

SUMMARY OF THE INVENTION

In order to overcome the many problems inherent in the complicated and expensive prior art devices, there is provided by the subject invention a new and novel improved transmission locking device. The Applicant's device is simple in construction and can be easily incorporated into an automotive transmission at the factory and can be added to an existing transmission in vehicles that are presently in operation.

No transmission design changes are required with the Applicant's device and in a modified form of the invention, damage to the transmission by an accidental movement of the shift lever is avoided.

The Applicants device in its various forms comprises an electro-mechanical disabling means, in the form of a solenoid in the preferred embodiment which is used to lock or disable an existing transmission parking shaft. This shaft is carried by the transmission case and is partially exposed on the outside of the case and partially exposed in side of the case.

In a modification of the preferred embodiment, the transmission parking shaft may be replaced with a split shaft design which has the solenoid positioned between the split shaft parts to thereby provide a modification which eliminates any accidental damage to the transmission shift lever.

The disabling means of the Applicant's invention may be enabled and disabled by means such as a hidden key lock which can operate the solenoid. It can also be enabled and disabled by a separate encoder device which may be positioned in the cab of the motor vehicle and forms part of one of the Applicant's previously discussed patent applications.

Electrical means are associated with the electromechanical solenoid attachment to the transmission parking shaft. These are utilized to operate the solenoid to engage or disengage it from the shaft as desired in the preferred embodiment. The electrical means may also comprise, in part, a decider circuit, along with an encoder device.

Accordingly, it is an object and advantage of the invention to provide a simplified device that can be quickly and easily positioned and used inside of the transmission case of a motor vehicle so as to have the ability to enable and disable the transmission as desired by the owner and operator of the vehicle.

Another object and advantage of the invention is to provide a device that can be used also on manual transmissions, with minor modifications, as well as being used on automatic transmissions.

A further object and advantage of the invention is to provide a device that may be used with the existing parking shaft of an automatic transmission of the various types available in the marketplace.

Still another object and advantage of the invention is to provide a security device to prevent theft of the motor vehicle which locks the transmission of the motor vehicle without utilizing ignition locks, steering column locks or other types of locks usually positioned outside of the transmission in various places between the transmission and the motor vehicle cab.

These and other objects and advantages will become apparent from a review of the drawings filed with the application and from a reading of the specification filed herewith describing, in detail, the Applicant's novel invention.

BRIEF DESCRIPTION OF THE DRAWINGS

FIG. 4 shows a disengaged or unlocked position of the solenoid shaft.

FIG. 5 shows an engaged or locked position of the solenoid shaft.

DESCRIPTION OF THE PREFERRED EMBODIMENT

Figure 1:
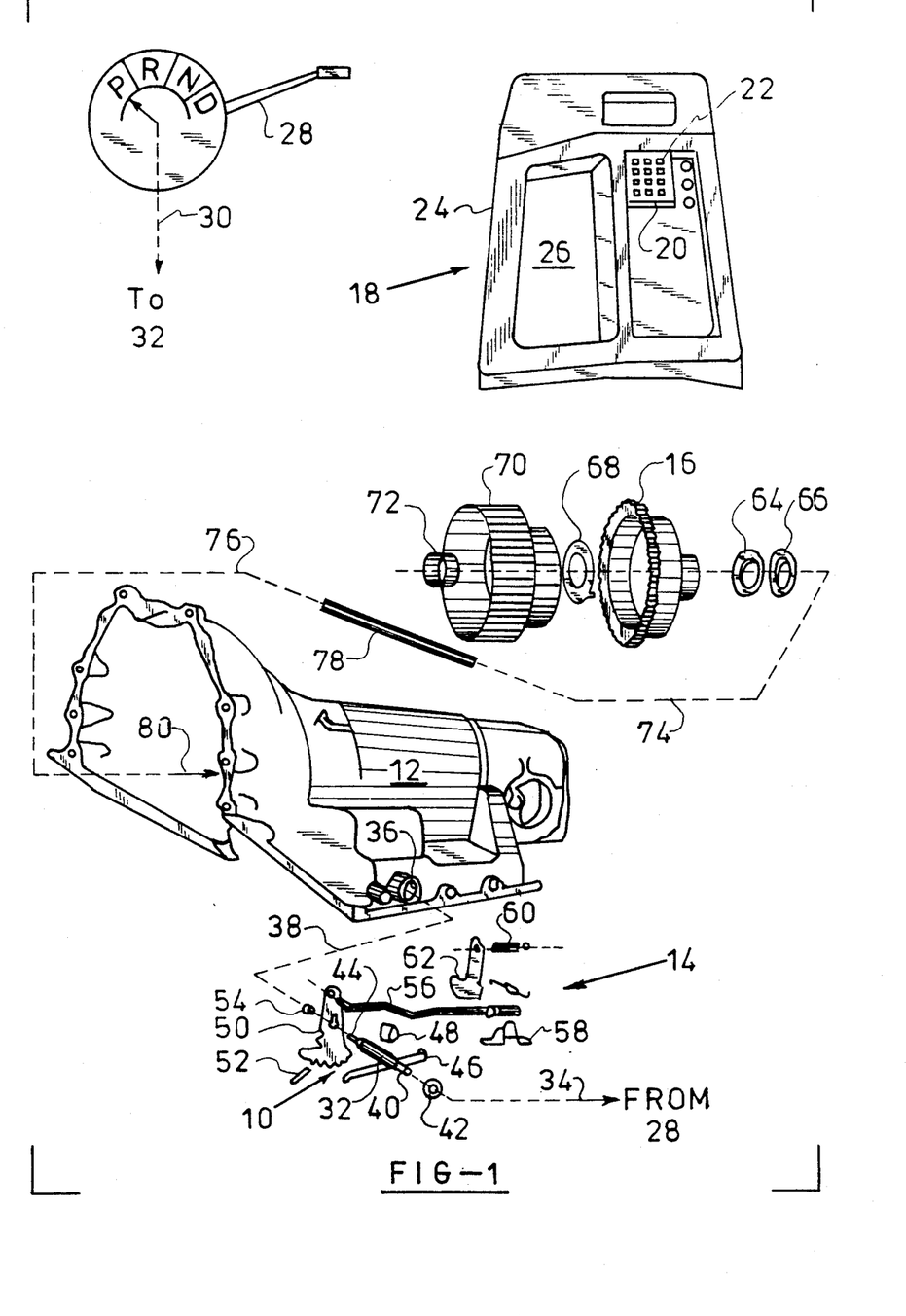
FIG. 1 is a schematic representation of the field of the Applicant's invention showing the use of the invention as applied to an automatic transmission and showing a cab mounted encoder unit.

Referring now to the drawings in general and in particular to FIG. 1 of the drawings, there is shown in FIG. 1, a schematic representation of the field of the Applicant's invention showing the use of the novel invention as applied to an automatic transmission in the preferred embodiment. An electro-mechanical disabling means, shown generally by the numeral 10 is applied at the position shown by the arrow to disable an automatic transmission 12 of the type having a gear locking mechanism shown generally by the numeral 14.

The disabling means, in the preferred embodiment, is applied to the gear locking mechanism 14. This will be described in some detail later and is further described in the applicant's patent applications previously mentioned. The gear locking mechanism 14 is the type generally used in a typical automatic transmission to lock the transmission parking gear 16.

This gear may also be called the output ring gear and is found inside of the transmission 12, as will be described more fully hereinafter. Variations of this gear locking mechanism 14 are used in various transmissions in the current automotive industry.

The disabling means, shown generally by the arrow 10, of the Applicant's invention is used to disable or lock the gear locking mechanism 14. This may be accomplished in various ways. One manner of disabling may use an enable/disable encoder, shown generally by the numeral 20. The enabling means encoder would comprise an outer encoder box, having a plurality of push-button contacts 22 positioned on the encoder 20.

The enabling means 18, when used with an encoder 20, would be positioned on a console 24 that is mounted in the cab of the motor vehicle. In the console 24, shown in FIG. 1, an opening 26 is formed for positioning of a four-wheel drive lever (not shown) which is used for the particular automatic transmission to which the Applicant's device has been applied. The disabling and enabling may also be accomplished by a single hidden switch and its appropriate circuitry to operate the solenoid used in the Applicant's device.

In a typical automotive vehicle having an automatic transmission, a shift lever 28 is positioned on the steering column (not shown) and is used by the driver of the vehicle to place the transmission 12 in the various transmission positions such as park (P), reverse (R), neutral (N) and drive (D). In FIG. 1, the arrow 30 represents, in a schematic form, the mechanical connection from the transmission lever 28 to the parking shaft 32 as used in various automobiles.

In other words, the shift lever 28 will mechanically rotate the parking shifting mechanism to operate the shaft 32 to accomplish the desired results inside of the transmission. The mechanical connections from the shift lever 28 to the parking shaft 32 is represented by the arrow 30 and the arrow 34 which is positioned at the lower portion of the transmission shown in FIG. 1. For purposes of clarity, the various shifting mechanisms have not been shown in the drawing and forms no part of the present invention.

The parking shaft 32, in a typical automatic transmission, is positioned in the transmission wall opening 36 as shown by the dashed line 38. The parking shaft 32 is partially exposed outside of the transmission wall opening 36 so that the parking shaft end 40 is exposed and can be connected to the mechanism from the shifting lever 28 as shown by the arrows 30 and 34.

An oil seal 42 is generally positioned around the parking shaft 32 to prevent transmission oil from leaking outside of the transmission case. A large portion of the parking shaft 32 is positioned inside of the transmission case and terminates with a parking shaft end 44. This end 44 is then normally connected to a plurality of various internal gear locking mechanism parts.

Some of these parts are shown in FIG. 1 and comprise a detect spring 46, retainer 48, lever 50, clip 52 and nut 54. In addition, the gear locking mechanism 14 would also generally comprise an actuator 56, bracket 58, shaft and plug 60 along with a parking pawl 62. These parts then generally make up a typical gear locking mechanism 14 for an automatic transmission and are positioned inside of the transmission case 12.

When so positioned, they are used in a typical automatic transmission to lock or immobilize the transmission when the shift lever 28 is in the park (P) position as shown in FIG. 1. For purposes of clarity, there has been shown in FIG. 1, the transmission parking gear 16 which is the gear that is generally locked by the parking pawl 62 in a typical automatic transmission.

This gear 16 would typically be surrounded by a plurality of parts, such as the ring gear bearing 64, the retainer ring 66 and the thrust washer 68 along with the planet carrier 70 and the bushing 72.

Other portions of the transmission are then connected to this grouping of parts which are positioned on an output shaft 78 shown in FIG. 1. The dashed line 74 and the dashed line 76 then represent this grouping of parts which are positioned inside the automatic transmission case as shown by the arrow 80. The various parts are also shown in the applicant's above described patent applications and are also included in the prior art filed with this application.

Figure 2:
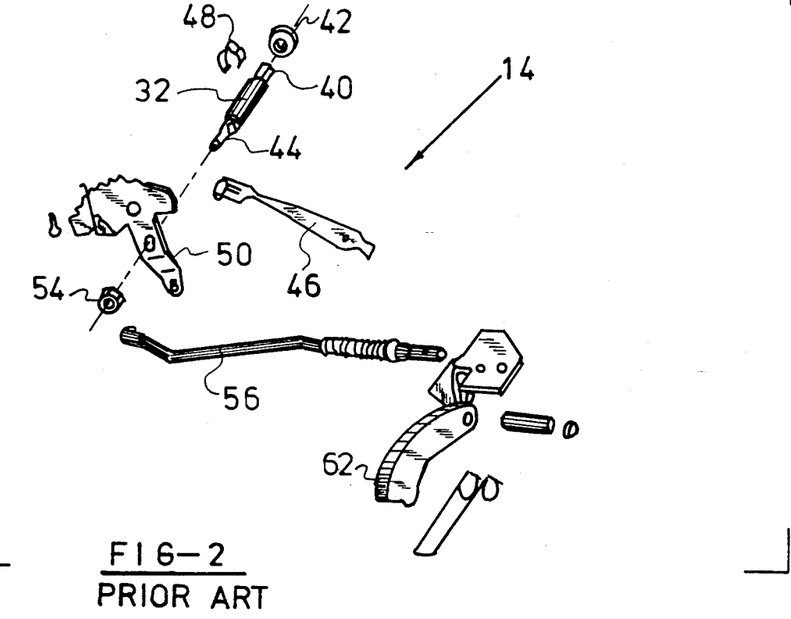
FIG. 2 is an exploded view of a prior art gear locking mechanism as used in a typical automatic transmission which would be modified to employ the Applicant's invention.

Referring now to FIG. 2 of the drawings, there will be shown in somewhat more detail, an enlarged exploded view of a prior art gear locking mechanism of the type before described and shown generally by the numeral 14. This gear locking mechanism 14, shown in FIG. 2 is from a General Motors automatic transmission and contains the before described parts of the gear locking mechanism 14. The parking shaft 32 which the Applicant uses in his invention to enable and disable the transmission parking gear 16 of a typical transmission can be seen in FIG. 2.

There can also be seen in FIG. 2, the parking pawl 62 which is typically used in prior art automatic transmissions to engage the transmission parking gear 16 (not shown in FIG. 2). While transmissions may vary from one manufacturer to another, typically the before described mechanism are used to operate the various automatic transmissions.

Figure 3:
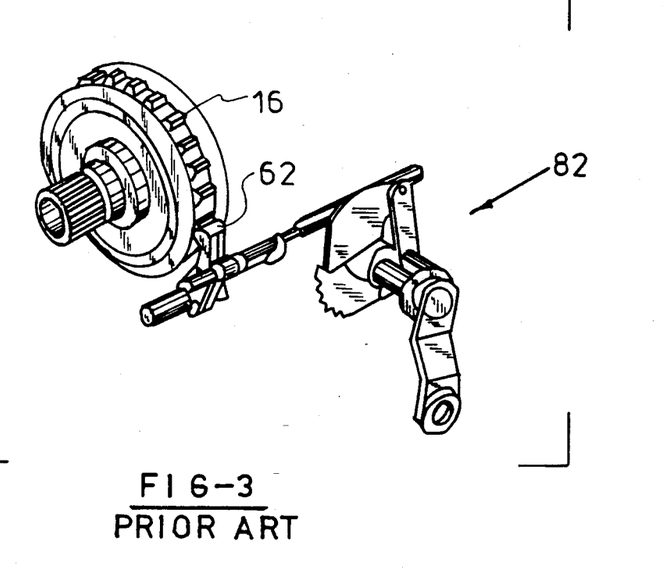
FIG. 3 is a perspective view of a prior art typical transmission parking gear, of a Subaru transmission. The transmission parking gear is sometimes called the output ring gear and is the gear which would be disabled by the Applicant's device.

For example, there is shown in FIG. 3 a perspective view of a typical automatic transmission parking gear 16 as used in a Subaru automatic transmission. It can be seen in FIG. 3, how a parking pawl 62 is used to lock the transmission parking gear 16 as desired through the gear locking mechanism, a portion of which is shown in FIG. 3 generally by the numeral 82 in this type of transmission.

Figure 4:
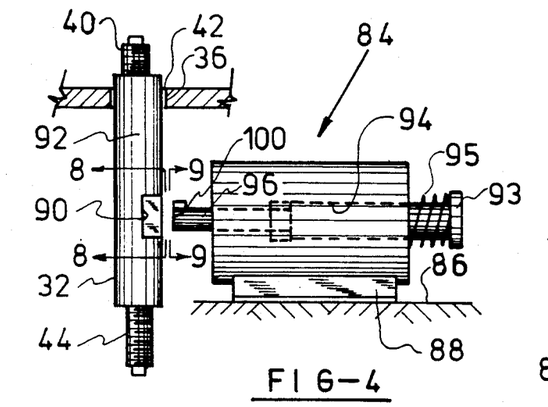
FIG. 4 is a plan view of a portion of the Applicant's enable-disable device utilizing a solenoid for engaging the transmission parking shaft of a typical automatic transmission to lock it in position.

FIG. 4 is a plan view of a portion of the Applicant's enable-disable device which utilizes a solenoid to engage the parking shaft 32 of a typical automatic transmission. The solenoid, shown generally by the numeral 84 is mounted, by known mounting means, to an inside surface or bracket 86 in the transmission 12 using the solenoid mounting bracket 88. A notch 90 is cut in the surface 92 of the existing parking shaft 32 as shown in FIG. 4. The solenoid shaft 94 is modified by adding a spring retainer 93 at the end of the shaft and a spring 95 to one end of the shaft. A solenoid shaft extension 96 is attached to the solenoid shaft 94 and is sized and formed to be able to engage in the notch 90 on the parking shaft 32.

FIG. 4 would be a representation of the position of the solenoid shaft 94 and solenoid shaft extension 96 in relation to the parking shaft 32 when in its normal operating or enabled position. In other words, the solenoid 84 shafts 94 and 96 are in the enabling position or the de-activated position which enables the parking shaft 32 to rotate without hinderance from the shaft extension 96 of the solenoid 84, as previously described, by the operation of the shift lever 28 and its associated mechanisms connected to the end 40 of the parking shaft 32. The spring 95 is not compressed and is held in place by the retainer 93 as shown in FIG. 4.

It can therefore be clearly seen in FIG. 4 how the solenoid shaft extension 96 is not engaged in the notch 90 and the solenoid has no effect on the transmission parking shaft 32. The solenoid 84 may be activated, as desired, by the encoder 20 or by a hidden electrical switch and also by other means that may be known in the art of switching to then position the shafts 94 and 96 as shown in FIG. 5.

Figures 5, 10, 11, 12, 14:
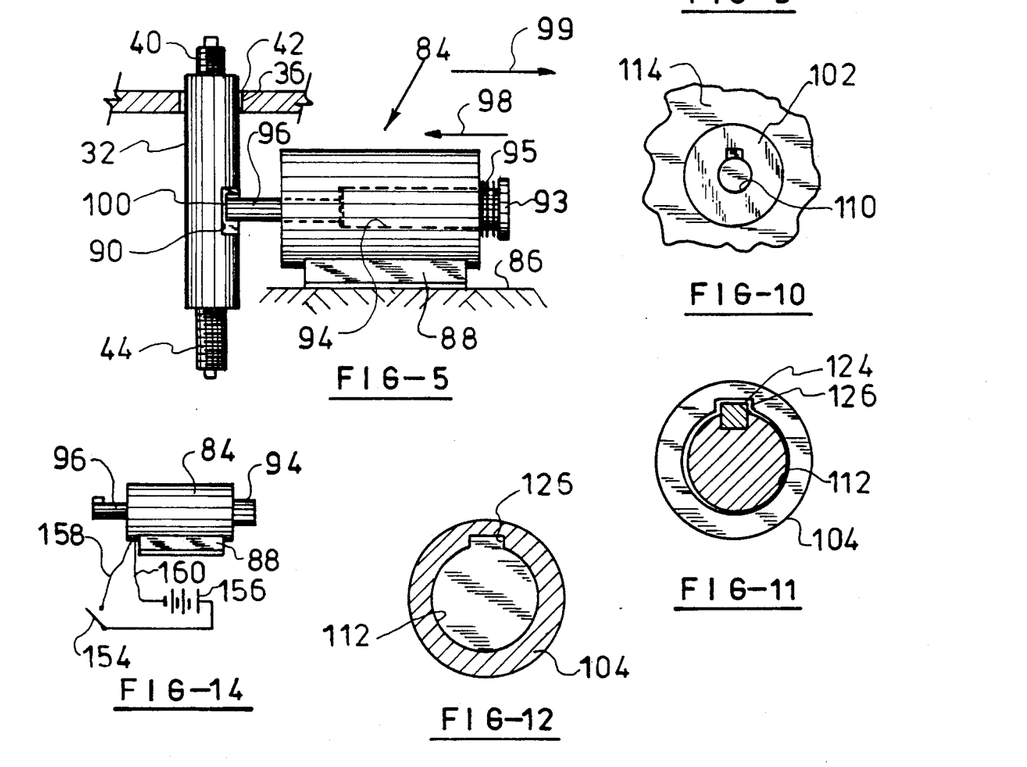
FIG. 5 is a plan view, similar to the view in FIG. 4, showing the Applicant's device disabling or locking the transmission parking shaft previously described by preventing the parking shaft from rotating.
FIG. 10 is an elevation view, taken along lines 10—10 of FIG. 6 showing the notch into which the solenoid end is positioned in a modified form of the Applicant's preferred embodiment.
FIG. 11 is a cross-sectional view, taken along lines 11—11 of FIG. 6, showing in detail, the notch in the other split end piece of the modification of FIG. 10.
FIG. 12 is a cross-sectional view, taken along lines 12—12 of FIG. 7.
FIG. 14 is a schematic of a simple circuit for activating the solenoid used in the applicant's application.

There is shown in FIG. 5, a plan view, similar to the view in FIG. 4, detailing how the Applicant's novel device can then disable the transmission parking shaft 32 and also the transmission parking gear 16 of the motor vehicle. This happens when the solenoid shaft extension 96 moves to the left as shown by the arrow 98, after being activated, until the end 100 of the solenoid shaft extension 96 is positioned in the notch 90.

When in this position, the parking shaft 32 is disabled or non-operative meaning that it cannot rotate or be rotated by the mechanism from the shift lever 28. This then also disables the transmission parking gear 32 to the extent that the transmission is not able to be moved from the previous parked (P) gear position set by the shift lever 28 when the operator has left his vehicle. As before described, the disabling of the transmission occurs by the activation of the solenoid 84 by an electrical switch, an encoder/decider or by other types of electrical switching devices.

For example, when the operator of the vehicle positions the shift lever 28 in the park position, the transmission and the vehicle will not be able to be moved as long as the shift lever 28 is in the parked (P) position. When using the Applicant's device, the operator would disable the transmission by the operation of the solenoid 84 to activate it to position the solenoid shaft extension 96 in the notch 90. This would then prevent the parking lever 28 from moving the transmission out of the park (P) position into a drive (D) position, thereby preventing theft of the automobile.

When in the disable position shown in FIG. 5, the spring 95 is compressed and will return the solenoid shafts 94 and 96 in the direction of the arrow 99, when the solenoid is de-activated by the driver of the motor vehicle with a switch or with an encoder/decoder device.

The operation of the solenoid 84, which is used to enable and disable the parking shaft 32 and in turn the parking pawl 62 as well as the transmission parking gear 16, may be controlled by various devices positioned, in part, outside of the transmission. One such device, as before mentioned, may be the use of the encoder 20, shown in FIG. 1, with its various electrical circuitry in combination with a decoder positioned inside of the transmission and not shown in the drawings.

The manner of enabling and disabling of the transmission at the parking shaft 32 is further detailed in the above cited Applicant's patent applications. The enabling and disabling of the solenoid 84 can also be done by the other means such as a simple switch or locking key switch that may be mounted either in the cab or underneath the automobile in some hidden position. Other means for operating of the solenoid 84 are also available by known prior art switching devices.

Figure 6:
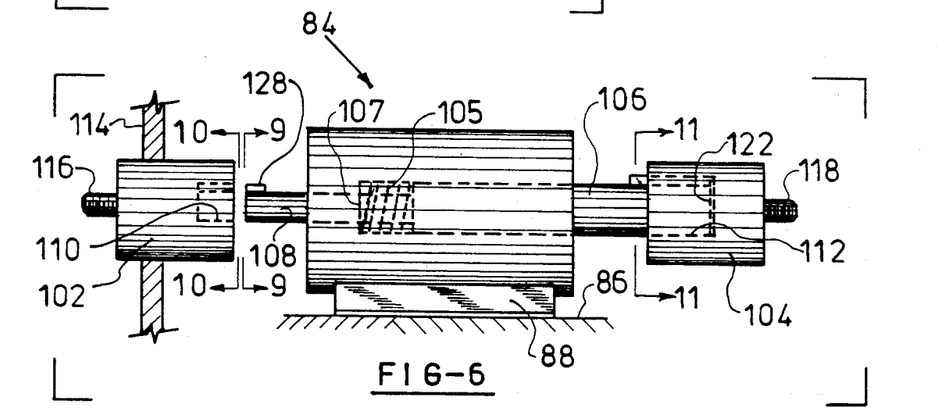
FIG. 6 is a plan view of a modification of the Applicant's invention showing how the parking shaft shown in FIGS. 4 and 5 may be replaced with a split shaft having a solenoid interposed between the two pieces of the split shaft. The view of FIG. 6 shows the disabled position or unlocked position of the device and the vehicle transmission.

Referring now to FIG. 6 of the drawings, there is shown a plan view of a modification of the Applicant's invention and showing how the previously described parking shaft 32 may be replaced with a pair of split shafts 102 and 104 with the solenoid 84 interposed between the two split shafts.

Figure 7:
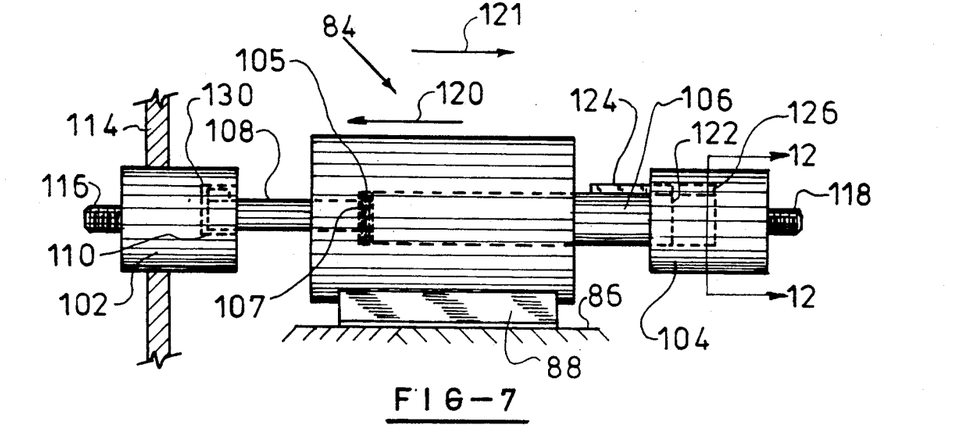
FIG. 7 is a plan view of the modification shown in FIG. 6 showing the Applicant's modified device operated to enable or lock the previously disabled transmission and the transmission parking gear of a typical automatic transmission. The view of FIG. 7 shows the enabled position of the device and of the vehicle transmission.

In the embodiment shown in FIGS. 6 and 7, the solenoid shaft 106 is modified as shown and includes a solenoid shaft extension 108 which is designed to engage in a notch 110 formed in the split shaft 102. The solenoid shaft extension 108 also has positioned around it, inside of the solenoid 84, a compression spring 105 as shown by the dashed lines in the drawings. This spring 105 is seated on the one end of the solenoid shaft 106 and on the internal surface 107 inside the solenoid.

The solenoid shaft 106 is designed to engage in a notch 112 formed in the split shaft 104 as shown in FIG. 6. In the FIG. 6 view, the solenoid shafts 106 and 108 of the solenoid 84 are shown in the disabled position which is in the position which would prevent the shift lever 28 from rotating the split shaft 104 inside the transmission. In this position, the solenoid 84 is de-activated and the spring 107 is not compressed. It can also be seen in FIG. 6 of the drawings, how the solenoid shaft extension 108 is separated from the notch 110. This separation cuts off any physical rotational movement and contact with the split shaft 104. The split shaft 102, which is operated by the shift lever 28 in the cab of the motor vehicle, can be moved which would prevent damage to the various parts if a thief tried to force the lever 28 to move. But no movement of the inner split shaft 104 could occur when the applicant's device is in the position shown in FIG. 6 of the drawings.

As can also be seen in FIG. 6, split shaft 102 is positioned through the transmission wall 14 and has an exposed end 116 similar to the exposed end 40 of the preferred embodiment device. This end 116 engages the previously described mechanism originating at the shift lever 28 and terminating at the outer side of the transmission.

The other split shaft 104 in the transmission also has an end 118 onto which would be threaded the various parts of the previously described prior art gear locking mechanism 14 such as the lever 50 shown in FIG. 1. When the solenoid shafts 106 and 108 of the solenoid 84 are in the position shown in FIG. 6, the shift lever 28 is able to be moved in the vehicle cab but the separation of the solenoid shaft extension 108 from the notch 110 prevents the inner operation of the gear locking mechanism 14 as a result of the separation. As a result, the transmission 12 is disabled from operation since the shift lever 28 cannot operate the internal gear locking mechanism 14.

As a result, should a thief try to steal the motor vehicle by shifting the shift lever 28 to the drive (D) position, the transmission 12 will still remain in the parked (P) position which is the position in which the operator of the vehicle would have locked the transmission parking gear 16 when he left the vehicle.

Referring now to FIG. 7 of the drawing, there is shown a plan view of the modification shown in FIG. 6 showing how the Applicant's modified device will then be able to be enabled or be used to unlock the transmission parking gear 16 so that the vehicle can be moved. In FIG. 7, the shaft extension 108 and the shaft 106 of the solenoid 84 has been moved to the left as shown by the arrow 120 as the solenoid is activated to permit the solenoid shaft extension 108 to engage the notch 110.

This movement is controlled externally from the encoder 20 or other switch circuitry as desired. The movement also causes the internal spring 105 to be compressed. The later de-activation of the solenoid 84 will then operate to permit the compressed spring 105 to move the solenoid shafts 106 and 108 to the right as shown by the arrow 121 to the position shown in FIG. 6.

It can also be seen in FIG. 7, how the end 122 is still positioned in the notch 112 of the split end 104. As a result, an application of motion from the shift lever 28 to the split shaft 102 from outside of the transmission, would result in the motion being transmitted through the solenoid 84 and through the split shaft 104 and then on to the parking pawl 62 to lock the transmission parking gear 16.

In effect, the FIG. 7 position shown operates to make the split shafts 102 and 104 along with the solenoid 84 function as a single or solid shaft when in this position. This then is the equivalent to the solid shaft 32 shown in the preferred embodiment when in this position.

In summary, FIG. 7 shows the enable position or the normal operating position of the Applicant's modified device whenever the motor vehicle is used by the owner and when the shift lever 28 is able to normally move between the park (P), reverse (R), neutral (N) and drive (D) positions as shown in FIG. 1 to operate the transmission 12.

Figure 8:
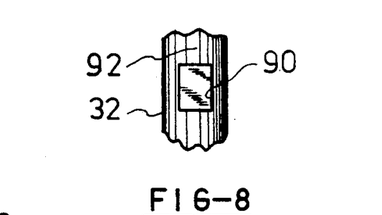
FIG. 8 is an elevation view, taken along lines 8—8 of FIG. 4 showing the notch into which the solenoid end is positioned in the Applicant's device.

Turning now to FIG. 8 of the drawings, there is shown an elevation view, taken along lines 8—8 of FIG. 4. A notch 90 is formed in the outer surface 92 of the parking shaft 32 for use in receiving the ends 100 of the solenoid shaft extension 96.

Figure 9:
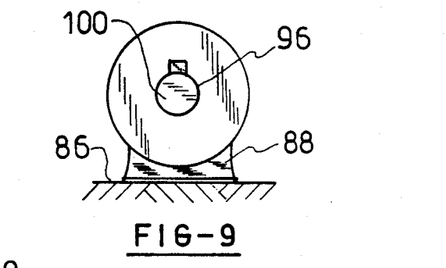
FIG. 9 is an elevation view, taken along lines 9—9 of FIG. 4, showing the end of the solenoid.

FIG. 9 shows an elevation view, taken along lines 9—9 of FIG. 4 and shows in detail the formation of the end of the solenoid shaft extension 96. The end 100 of the solenoid shaft, as before described, then will be able to be positioned in the notch 90 shown in FIG. 8 whenever it is desired to lock the parking shaft 32.

FIG. 10 is an elevation view, taken along lines 10—10 of FIG. 6 and shows how the solenoid shaft extension 108 of the modification of FIG. 6 and 7 is designed. From FIGS. 10 and 6, it can be seen how the solenoid shaft extension 108 is formed in a similar manner to the solenoid shaft extension 96 of the FIG. 4 modification and a s indicated by the arrow lines 9—9. This shaft extension 108 is designed to fit and engage in the notch 110 shown in FIG. 10 and also in FIG. 6. This is the unlocked or enabled position of this variation and is shown in FIG. 7 of the drawings.

Turning now to FIG. 11 of the drawings, there is shown a cross-sectional view, taken along lines 11—11 of FIG. 6, showing in more detail the notch 112 formed in the split end shaft 104. It can be seen how the end 122 of the solenoid shaft 106 is positioned and received in this notch. A protuberance or key 124 is also be fixed to or formed in the solenoid shaft 106 and is designed to be received in the keyway 126 formed in the notch 112.

In a similar manner, the solenoid shaft extension 108 is formed with a protuberance or key 128 which is designed to be positioned and engage in the keyway 130 formed in the notch 110. When formed in this manner, the Applicant's modified device will allow an application of power from the end 116 of the split shaft to the other end 118 of the other split shaft. The keys 124 and 128 along with their respective keyways 126 and 130 permit the rotational movement to occur.

FIG. 12 is a cross-sectional view, taken along lines 12—12 of FIG. 7 and show in further detail the construction of the keyway 126 and its relation tot he notch 112.

Figure 13:
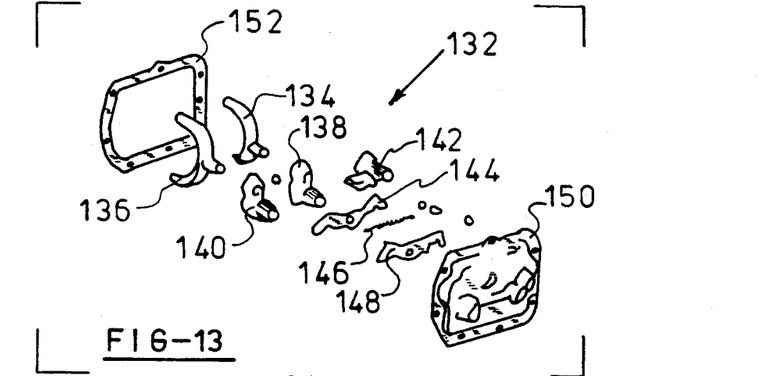
FIG. 13 is an exploded perspective view showing portions of a four-speed manual transmission which may be disabled and then enabled using the novel device taught by this application.

FIG. 13 is an exploded perspective view showing portions of a General Motors four-speed manual transmission shown generally by the numeral 132. A transmission such as this may also be disabled and enabled by using the Applicant's basic concept on an existing shaft assembly of the transmission. A pair of gear shift forks 134 and 136 are found in this transmission positioned inside of the transmission case. The gear shift fork 134 is used for the first and second gears while the gear shift fork 136 is used for the third and fourth gears.

The movement of the forks is controlled by a first and second gear shift shaft assembly 138 and a third and fourth gear shaft assembly 140. The reverse shift shaft assembly 142 is also shown in FIG. 13 along with various other parts that normally make up this assembly for this particular transmission, such as the cam 144, spring 146, cam 148, case cover 150 and gasket cover 152.

The Applicant's device, in its preferred embodiment form of FIGS. 4 and 5 as well as in its modified form FIGS. 6 and 7, could then be adapted to operate on the various gear shift shafts used in the shaft assemblies 138 and 140 by a simple modification of these assemblies. The Applicant's novel device could also be utilized in the modified form to replace the shafts in the shaft assemblies 138 and 140 to accomplish the same desired results which have been accomplished on automatic transmissions.

While FIG. 13 shows only one type of manual transmission, other known types may also be modified using the Applicant's novel concept within the spirit and scope of his invention.

FIG. 14 illustrates a simple circuit, in place of the encoder circuitry, for operating the solenoid 84 from a remote switch 154 which is connected to the automobile battery 156 and to the wires 158 and 160 of the solenoid 84. The switch 154 may a simple switch or a key operated switch and may be mounted in a hidden place on the automobile for use by the driver as he enables and disables the transmission to prevent his vehicle from being stolen.

The solenoid 84 may be replaced by a dual-acting solenoid which would eliminate the need for the spring 95 in FIGS. 4-5 and the spring 105 in the FIG. 6-7 embodiment and such replacement is considered to be within the spirit and scope of the invention.

The solenoid 84 as used with the various spring configurations may be modified along with the springs to obtain a different configuration. For example, a push type of solenoid could also be used with different springs so that the operation of the solenoid would be reversed.

This would then allow the applicant's device to operate without draining power from the motor vehicle when the operator was away from the vehicle.

From the foregoing it can be seen that there is provided by the subject invention a new and novel device which accomplished all of the objects and advantages hereinbefore described as well as many other advantages.

Nevertheless, it will become apparent from a review of the drawings and from a study of the Description of the Preferred Embodiment that modifications may be made to the various parts and the positioning of the parts in relation to each other. While the preferred embodiment and a modification has been shown and described these have been given by way of illustration only and the Applicant is not to be limited to the exact structure shown and described.

Having described my invention, I claim:

1. In a motor vehicle automatic transmission of the type having a case and having an internal parking gear and the transmission having a parking shaft with a pair of ends, one end being positioned outside of the transmission and connected to a transmission selector lever in the motor vehicle and the other end positioned inside the transmission case and connected to an internal parking pawl operating mechanism, the improvement comprising:

(a) electro-mechanical disabling means, associated with the parking pawl operating mechanism and positioned inside the transmission case, to disable the parking pawl operating mechanism from being able to move the parking pawl once the pawl is locked on the transmission parking gear by the transmission selector lever and to retain the transmission in a parked position, wherein the disabling means comprises, in part, a notch formed in the existing transmission parking shaft and further comprises a solenoid and solenoid plunger, positioned in proximity to the notch in the existing transmission parking shaft to be operable to engage the notch with the solenoid plunger as desired to disable the movement of the parking shaft thereby preventing operation of the transmission selection lever to be able to move;

(b) enabling means, associated with the disabling means and located, in part, outside of the transmission case, to enable the parking pawl operating mechanism to operate as desired so as to be able to disengage the parking pawl from the transmission parking gear, thereby permitting the transmission to be operated as desired; and (c) electrical means, associated with the electro-mechanical disabling means and the enabling means and positioned partly inside the transmission case and partly outside of the transmission case to activate the enabling means as desired.

2. The improvement as defined in claim 1 wherein the enabling means comprises, in part, an encoder/decoder with the encoder being positioned in the motor vehicle cab and with the decoder being positioned in the transmission case in proximity to the electro-mechanical disabling means.

3. The improvement as defined in claim 1 wherein the enabling means comprises a switch positioned outside of the transmission which is used by the operator of the vehicle to operate the electro-mechanical disabling means.

4. In a motor vehicle automatic transmission of the type having a case and having an internal parking gear and the transmission having a parking shaft with a pair of ends, one end being positioned outside of the transmission and connected to a transmission selector lever in the motor vehicle and the other end positioned inside the transmission case and connected to an internal parking pawl operating mechanism, the improvement comprising:

(a) electro-mechanical disabling means, associated with the parking pawl operating mechanism and positioned inside the transmission case, to disable the parking pawl operating mechanism from being able to move the parking pawl once the pawl is locked on the transmission parking gear by the transmission selector lever and to retain the transmission in a parked position, wherein the electro-mechanical disabling means comprises, in part, a modified transmission parking shaft to replace the existing transmission parking shaft, the modified parking shaft comprising a disabling mechanism formed with a solenoid and a solenoid plunger interposed between a pair of split shafts having opposite ends, one of the opposite shaft ends being capable of being disabled from the other split shaft end by the operation of the solenoid and the solenoid plunger;

(b) enabling means, associated with the disabling means and located, in part, outside of the transmission case, to enable the parking pawl operating mechanism to operate as desired so as to be able to disengage the parking pawl from the transmission parking gear, thereby permitting the transmission to be operated as desired; and (c) electrical means, associated with the electro-mechanical disabling means and the enabling means and positioned partly inside the transmission case and partly outside of the transmission case to activate the enabling means as desired.

5. The improvement as defined in claim 4 wherein the enabling means comprises, in part, an encoder/decoder with the encoder being positioned in the motor vehicle cab and with the decoder being positioned in the transmission case in proximity to the electro-mechanical disabling means.

6. The improvement as defined in claim 4 wherein the enabling means comprises a switch positioned outside of the transmission which is used by the operator of the vehicle to operate the electro-mechanical disabling means.

* * * * *